Figure 1:
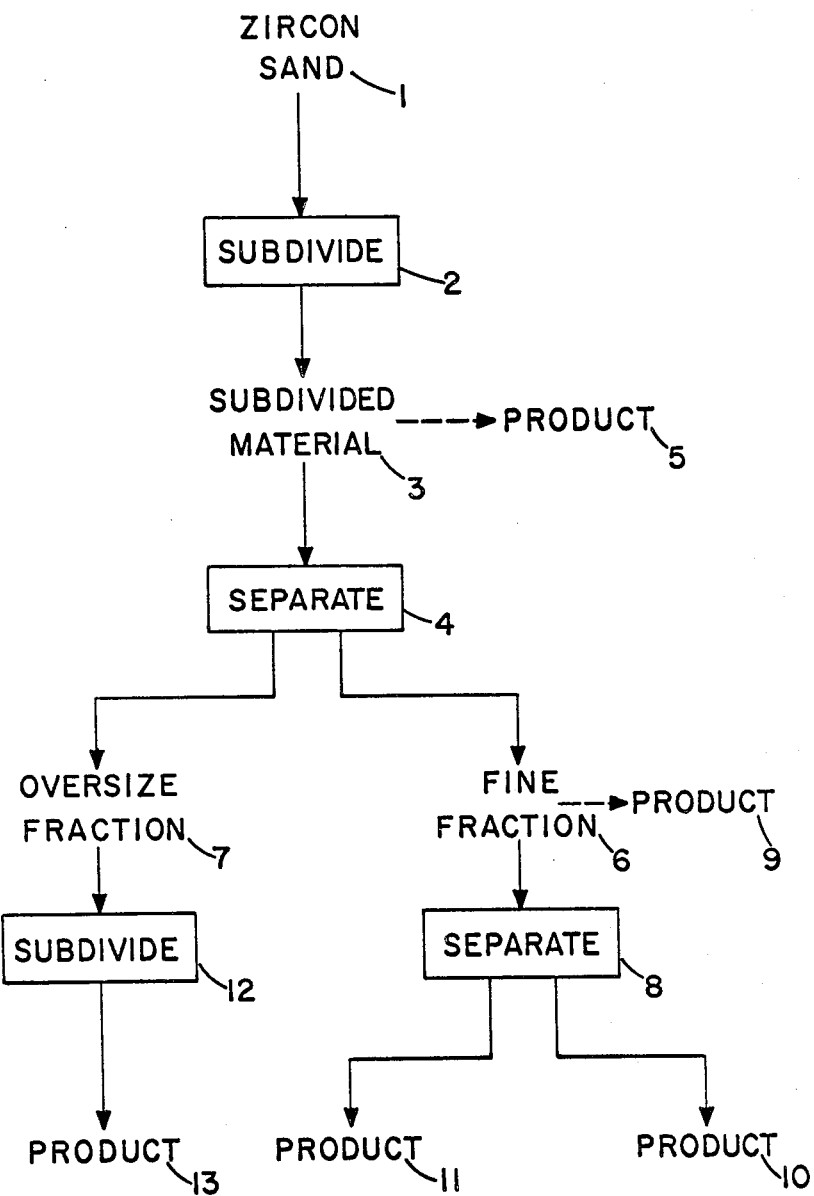

FIG. I

Oct. 5, 1965  T. S. COSTAIN ETAL  3,210,204
ZIRCONIUM SILICATE OPACIFIED CERAMIC GLAZE COMPOSITIONS
Filed Dec. 18, 1962  2 Sheets-Sheet 2
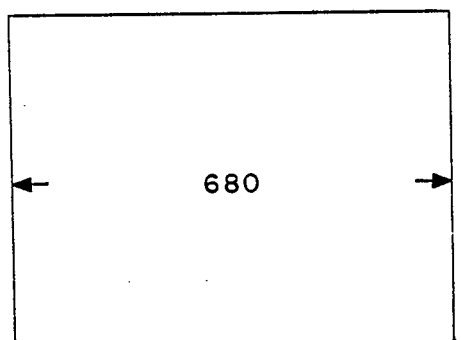
FIG. 2
SCALE
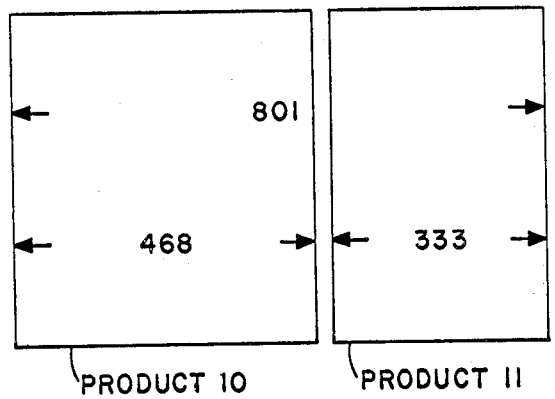
FIG. 3
Inventors
THOMAS S. COSTAIN
ELLIOTT L. WEINBERG
ARTHUR H. LULEY
RALPH R. DANIELSON
By
Attorney

United States Patent Office 3,210,204
Patented Oct. 5, 1965

3,210,204
ZIRCONIUM SILICATE OPACIFIED CERAMIC GLAZE COMPOSITIONS
Thomas S. Costain, Andover, Elliott L. Weinberg, South River, Arthur H. Luley, Westfield, and Ralph R. Danielson, Rahway, N.J., assignors, by mesne assignments, to American Can Company, a corporation of New Jersey
Filed Dec. 18, 1962, Ser. No. 245,487
2 Claims. (Cl. 106—48)

This application is a continuation-in-part of application Serial No. 449,708 filed August 13, 1954, and now abandoned.

This invention relates to zirconium silicate products and has as one of its objects an improved method of preparing them. Another object of the invention is the provision of zirconium silicate products which are valuable as opacifiers, some also being valuable as source materials for preparing opacifiers, and some of which may be valuable in other ways. The method is characterized by a capacity to produce a 100% yield of useful products from the initial source of feed material which, as will be described, is converted to products of superior value. Other objects and advantages will become apparent hereinafter.

The invention may be better understood by referring to the accompanying drawing in which is shown in FIGURE 1 a flow diagram illustrating an over-all method of transforming zircon sand to various products.

Zircon sand, consisting essentially of zirconium orthosilicate, and indicated in FIG. 1 as 1, is subjected to pulverization in zone 2, preferably with the sand in the form of an aqueous slurry and using a ball mill or other suitable pulverizing equipment to subdivide the sand. The subdivided material 3, equal in weight to the starting material 1, is separated into two fractions in zone 4. Optionally, at least a portion of the material 3 may be taken as product 5 for use as an opacifier. Material 3 or product 5 has a particle size between 0.1 and 10 microns, with about 80% of the particles having a size between 0.1 and 5 microns and about 35% having a size between 0.1 and 1.0 micron. It is prefered to subject material 3 to further separation in zone 4, the material being slurried in water and the separation preferably being carried out centrifugally. Other separating techniques may be employed, such as fractional sedimentation, settling or elutriation. Following separation in zone 4, the fractions are settled, water is removed, and the fractions are dried. A fraction 6 of finer particle size, constituting about 65% of material 3, and a fraction 7 of larger particle size, constituting about 35% of material 3, are produced by the separation. The particles of fraction 6 have a size between 0.1 and 8.0 microns, with about 80% of the fraction having a size between 0.1 and 3.0 microns and about 45% having a size between 0.1 and 1.0 micron. Fraction 6 has a greater opacifying power than material 3. At least a portion of fraction 6 may optionally be removed as product 9, but preferably the fraction is subjected to separation in zone 8 to produce two products 10 and 11. The separation is desirably made by centrifugal means. Product 10 comprises about 25% of material 3 and has a particle size between about 0.1 and 1.0 micron. Its opacifying power is greater than that of any of the other products. Product 11 comprises about 40% of material 3 and has a size mainly between 1.0 and 3.0 microns with about 30% of it having a size of 1.0 micron or less, that is between 0.1 and 1.0 micron; it ranks below fraction 6 and product 10 in opacifying power.

The oversize fraction 7 is subjected to a process of subdivision in zone 12 to produce a product 13 comprising about 25% of material 3 and having a particle size in the range of 0.1 and 10 microns. Product 13 has substantially the same opacifying power as product 5.

As may be apparent, no downgrading has taken place; in other wards, the products resulting from material 3, comprising products 9, 10, 11, and 13, are at least of equal value as or superior to material 3. Product 10 has execptional opacifying power; it is a fraction not only of very fine particle size, at least 98% if it being finer than 1.0 micron, but also substantially of uniformly sized particles. Product 11 is superior to certain commerical grade opacifying material, as is product 9.

The invention is particularly characterized by the step comprising subjecting fraction 6, or a substantially similar fraction no matter how obtained, to separation in zone 8 to yield products 10 and 11, or substantially similar products. It has been found that when products 10 and 11 are separately used as opacifiers, their total opacifying power, expressed in terms of the amount of base glaze they can opacify, is greater than the opacifying power of fraction 6, from which they were derived, the combined amounts of products 10 and 11 which are used in this connection being equal to the amount of fraction 6. With some glazes, the total opacifying power of products 10 and 11 is up to 20% greater than that of fraction 6, and generally is 10 to 20% greater. The gain in opacifying power is illustrated in Examples 3 and 4.

These products may be used to opacify a wide variety of glazes for different firing temperatures and applications. Some illustrative glaze compositions, including the opacifier, are as follows, the quantities being in terms of weight percent.

| Glaze No. | 1 | 2 | 3 | 4 | 5 | 6 | 7 |
|---|---|---|---|---|---|---|---|
| $Na_2O$ | 3.73 | 3.09 | 3.18 | 2.87 | 5.72 | 0.98 | 0.68 |
| $K_2O$ | 1.59 | 1.85 | 2.91 | 1.08 | 3.01 | 4.60 | 2.64 |
| $CaO$ | 3.32 | 4.56 | 8.25 | 5.28 | 3.49 | 4.50 | 1.65 |
| $ZnO$ | 2.22 | 7.27 | 9.75 | 8.33 | 1.28 | 6.70 | ------ |
| $PbO$ | 12.10 | 8.75 | ------ | 19.05 | 13.90 | ------ | ------ |
| $MgO$ | ------ | ------ | ------ | ------ | ------ | 2.50 | 5.14 |
| $BaO$ | 8.30 | ------ | ------ | ------ | 7.07 | ------ | ------ |
| $Al_2O_3$ | 5.85 | 8.15 | 9.18 | 7.12 | 8.26 | 12.24 | 11.98 |
| $B_2O_3$ | 7.45 | 5.10 | 4.68 | 6.05 | 4.24 | ------ | ------ |
| $SiO_2$ | 47.32 | 49.90 | 51.58 | 43.10 | 46.80 | 58.50 | 70.67 |
| $ZrO_2$ | 8.12 | 11.30 | 10.48 | 7.10 | 6.20 | 10.00 | 7.24 |

Generally, the amount of opacifier may vary from about 5 or 6% to about 20 or 25% by weight of the glaze composition.

The over-all method illustrated in the drawing is exemplified in Example 1.

*Example 1*

Five thousand lbs. of zircon sand consisting essentially of zirconium orthosilicate were mixed with 1000 lbs. (120 gallons) of water and 1.5 lbs. (500 ml.) of 40° Be. nitric acid and the resulting mixture charged to a ball mill lined with Belgian block and containing flint pebbles. The sand was ground for 24 hours and then transferred to a feed tank where enough water was added to make a slurry containing about 25% solids by weight. The slurry was continuously agitated while in the feed tank and was fed over a period of time to a Sharples solid-bowl, cone-shaped, horizontal centrifuge where the solids were separated into two fractions. One fraction comprising the finer particles was passed in the form of a thin slurry to a surge tank and then pumped to a settling tank. To promote settling, ammonium nitrate and ammonia, each in an amount of 0.2% of the total weight of water in the settling tank were added to the tank and the mixture allowed to settle overnight. The clear supernatant water was syphoned off, leaving a slurry containing about 50% solids by weight, and this was then dried on a drum drier. Agglomerates were reduced by running the material through a pulverizer. The fraction totalled about 3250 lbs. of dried material or 65% of the original charge. The second fraction from the centrifuge, comprising larger particles, was collected separately. This material, corresponding to fraction 7 of the drawing, may be used as wet milled zircon, but preferably it is subjected to further grinding. In the present instance it was transferred to the ball mill and ground for 24 hours in the manner described for the zircon sand, removed from the mill, allowed to settle, dewatered, dried and subjected to agglomerate reduction. The fraction totalled about 1750 lbs. or 35% of the original charge.

Tests were run on material from the 65% and 35% fractions, the results of which are set forth below. The 65% fraction was then slurried in water, transferred to a feed tank, and then during constant agitation passed to the centrifuge where it was separated into a fraction of finer particles and a fraction of larger particles. Both fractions were dewatered, dried, etc. in the manner described for the 65% fraction. Taking into account the amount of material used for testing, the yield of the finer fraction was 1250 lbs. and that of the larger fraction 2000 lbs., or 25% and 40%, respectively, of the original charge of zircon sand. Both fractions were subjected to the tests described below, which included particle size measurements, and reflectance and whiteness or yellowness index determinations on glazes opacified with the various fractions. Tests were also run on a commercial grade zirconium silicate opacifier, identified as X, for comparative purposes. The pertinent data are as follows:

| Fraction Identification | Particle Size, microns, percent in— | | Opacifying Power | |
|---|---|---|---|---|
| | Over-all Range | Smaller Range | Reflectance, percent | Y.I. |
| 65% | 0.1–8.0 | 80% between 0.1 and 3.0<br>45% between 0.1 and 1.0 | 82.2 | 0.059 |
| 40% | 0.1–3.0 | 30% between 0.1 and 1.0 | 80.5 | 0.076 |
| 25% | 0.1–1.0 | | 84.3 | 0.052 |
| 35% | 0.1–10 | | 80.1 | 0.080 |
| X | | 35% between 0.1 and 1.0 | .80.5 | 0.074 |

The opacifying power of each fraction was determined by making up a base glaze or frit and adding a quantity of the fraction to it. In each case the base glaze was the same, comprising a high temperature sanitary ware cone 11 glaze made up of the following materials in terms of parts by weight: flint 168, feldspar 354, Georgia kaolin 99, napheline syanite 21, whiting 67, talc 78, and zinc oxide 63. In each case, also, the ratio of the amount of fraction to the amount of base glaze was the same, being 130 parts of fraction for 850 parts of base glaze. In terms of its oxide content the glaze composition, including opacifier, resembled that of Glaze No. 6, noted above. Each mixture of base glaze and fraction was applied to a ceramic plate and fired, as in the manufacture of sanitary ware, the ceramic plates and firing conditions being uniform. To obtain comparable results, the plates were fired together. Reflectances of the glazed plates were obtained with a Hunter reflectometer, the values reported above being those obtained when using a green filter. Data on whiteness or yellowness index (Y.I.) were obtained by calculation from the reflectance values in the blue, amber, and green; more particularly, the yellowness index is obtained by subtracting the blue filter reading from the amber filter reading and then dividing by the green filter reading. The reflectance and Y.I. values for the 35% fraction were calculated, being based on a comparison with product X in a separate test. Particle sizes were determined by a hydrometer method like that described in A.S.T.M. Method D422–51, "Standard Methods for Mechanical Analysis of Soils." A superior product, that is, a whiter and more opaque product, is indicated by a higher green reflectance and/or a lower yellowness index. Visual comparisons were also made, based on the appearance (color, opacity, finish) of the glazed plates, and on this basis X was rated "good," the 35% cut "good minus," the 40% cut "good plus," the 65% cut "very good," and the 25% cut "superior." The 35% cut was not quite as good as X, while the other cuts were better, with the 25% cut better than the others.

As may be understood, greater opacification may be obtained by increasing the amount of opacifier in the glaze.

The production of opacifying materials is also illustrated in Example 2.

*Example 2*

A 1000-lb. batch of zircon sand, slurried in water as described in Example 1, was ground in a ball mill having a smaller capacity than that used for Example 1. After 36 hours of grinding, the ground product was separated into two cuts, the first or fine cut totaling 650 lbs. or 65% of the original batch. The latter was again subjected to centrifugal separation in the manner described in Example 1 to yield two cuts, the first totaling 250 lbs. and the second 400 lbs., or 25% and 40%, respectively, of the original batch. Using the cone 11 sanitary ware base glaze of Example 1, tests were run on the 65%, 40%, and 25% cuts as well as on the commercial grade material X, referred to in Example 1. In each case, 137 parts of opacifier were used for 850 parts of base glaze. The 65%, 40%, and 25% cuts produced reflectances in the green that were higher than that of material X by the following quantities: 0.6, 1.0, and 3.6, respectively. In regard to yellowness index the 65% and 25% cuts were less than X by 0.001 and 0.014 units, respectively, and the 40% cut was greater by 0.007 unit. The particles sizes of the above fraction were substantially the same as the corresponding fractions of Example 1.

The following examples demonstrate the opacifying power of two fractions, such as products 10 and 11 in FIGURE 3 of the drawing in comparison with the material from which the fractions were derived, such as fraction 6 of the drawing. The examples illustrate the amounts of base glaze that can be opacified to the same reflectance and the same degree of whiteness.

*Example 3*

A ground zircon material corresponding to fraction 6 of the drawing was prepared as described in Example 1. It had a particle size between 0.1 and 3 microns. Two batches, each 100 parts by weight, were taken. The first batch was added to 680 parts by weight of a cone 3 base glaze making a total of 780 parts. The base glaze had the following composition, the quantities being in terms of weight percent: $Na_2O$ 3.7, $K_2O$ 3.39, $CaO$ 9.61, $ZnO$ 11.35, $Al_2O_3$ 10.70, $B_2O_3$ 5.45, and $SiO_2$ 55.80. The second bath was slurried with water and centrifugally classified by the procedure described in Example 1 to produce 38.5 parts of a cut comprising particles in the range of 0.1 to 1 micron and 61.5 parts of a cut comprising particles in the range of 1 to 3 microns. The 38.5 part cut was added to 468 parts of the base glaze noted above, making a total of 506.5 parts; and the 61.5 part cut was added to 333 parts of the same base glaze making a total of 394.5 parts. All three opacified glazes were then applied to bisque ceramic tile, and the tile fired in one kiln. All of the tile had glazes that were whitened to the same high degree and each glaze had a reflectance in the green of 83.5%. The degree of whiteness (yellowness index) and the reflectance were determined as described in Example 1. The results may be tabulated as follows:

| Opacifier, Amount in parts | Particle Size, Over-all Range | Base Glaze, parts | Opacifying Power | |
|---|---|---|---|---|
| | | | Reflectance, percent | Y.I. |
| 100 | 0.1–3.0 | 680 | 83.5 | 0.089 |
| 38.5 | 0.1–1.0 | 468 | 83.5 | 0.086 |
| 61.5 | 1.0–3.0 | 333 | 83.5 | 0.085 |

It is apparent that when used separately, the 38.5- and 61.5-part cuts opacified a total of 801 parts of the base glaze, while the 100-part batch of ground zircon was able to opacify only 680 parts of base glaze. Approximately 18% more base glaze was opacified by employing the cuts separately.

The results of this particular example most vividly illustrate the completely unexpected advantages of certain aspects of this invention. To facilitate an understanding of these features, the above data are schematically set forth in FIGURES 2 and 3 of the drawing. It will be noted that 100 parts of the material (labelled Fine Fraction in FIGURE 1) may be used to opacify a product containing 680 parts of base glaze to a standard opacifying power measured in terms of percent reflectance and yellowness index. This fact is shown schematically in FIGURE 2 wherein the rectangle has a width of 680 units, the rectangle thereby representing the area of standard base glaze which was opacified by the fraction 6.

In practice of this aspect of the invention as set forth in this example, 100 parts of fraction 6 are split as herein disclosed to yield 61.5 parts of product 10 and 38.5 parts of product 11. Each of product 10 and 11 was then separately added to the same standard base glaze until the latter was opacified to the same standard opacifying power, measured in terms of percent reflectance and yellowness index, as that to which the fraction 6 had been added. These facts are shown schematically in FIGURE 3 wherein the left-hand rectangle, labelled product 10, has a width of 468 units, the rectangle thereby representing the amount of standard base glaze which was opacified by the product 10; and the right-hand rectangle, labelled product 11, has a width of 333 units, the rectangle thereby representing the amount of standard base glaze which was opacified by the product 11.

Thus it will be apparent that by practice of this invention, it is possible by means of a novel classification process to convert 100 parts by weight of a material which can opacify 680 parts of standard base glaze into two fractions or products, totalling 100 parts by weight, which together can opacify 468 plus 333 or 801 parts of standard base glaze.

A classification operation thus permits attainment of products which possess 18% more opacification power than the material from which they were obtained.

*Example 4*

The work of Example 3 was repeated except that the base glaze was the cone 11 sanitary ware glaze described in Example 1. The 38.5-part cut and 61.5-part cut opacified 451 and 344 parts of base glaze, respectively, for a total of 795 parts of the base glaze. Approximately 8% more base glaze was opacified by employing the cuts separately. The data are taubulated below:

| Opacifier, Amount in parts | Particle Size, Over-all Range | Base Glaze, parts | Opacifying Power | |
|---|---|---|---|---|
| | | | Reflectance, percent | Y.I. |
| 100 | 0.1–3.0 | 734 | 81.5 | 0.065 |
| 38.5 | 0.1–1.0 | 451 | 81.5 | 0.068 |
| 61.5 | 1.0–3.0 | 344 | 81.5 | 0.067 |

While the invention has been described with reference to specific embodiments, it will be apparent to those skilled in the art that various changes and modification may be made thereto.

We claim:

1. A ceramic glaze composition characterized by its high degree of opacity comprising a base glaze, and zirconium silicate particles at least 98% of which particles are less than 1.0 micron in diameter.

2. A ceramic glaze composition characterized by its high degree of opacity comprising 100 parts by weight of a base glaze and 5–25 parts by weight of zirconium silicate particles at least 98% of which particles are less than 1.0 micron in diameter.

References Cited by the Examiner

UNITED STATES PATENTS 2,427,799  9/47  Maloney _____ 51—308
2,694,004  11/54  Coffeen _____ 106—299

FOREIGN PATENTS 868,052  9/41  France.

OTHER REFERENCES

Jacobs et al.: J. Amer. Cer. Soc., June 1954, "Effects of Zirconium-Type Opacifiers on Properties of Glazes," (pages 258–266).

TOBIAS E. LEVOW, *Primary Examiner.*